July 29, 1958   F. J. DIXON   2,845,246
ACTUATING TORQUE EQUALIZING DEVICE
Filed Sept. 12, 1955
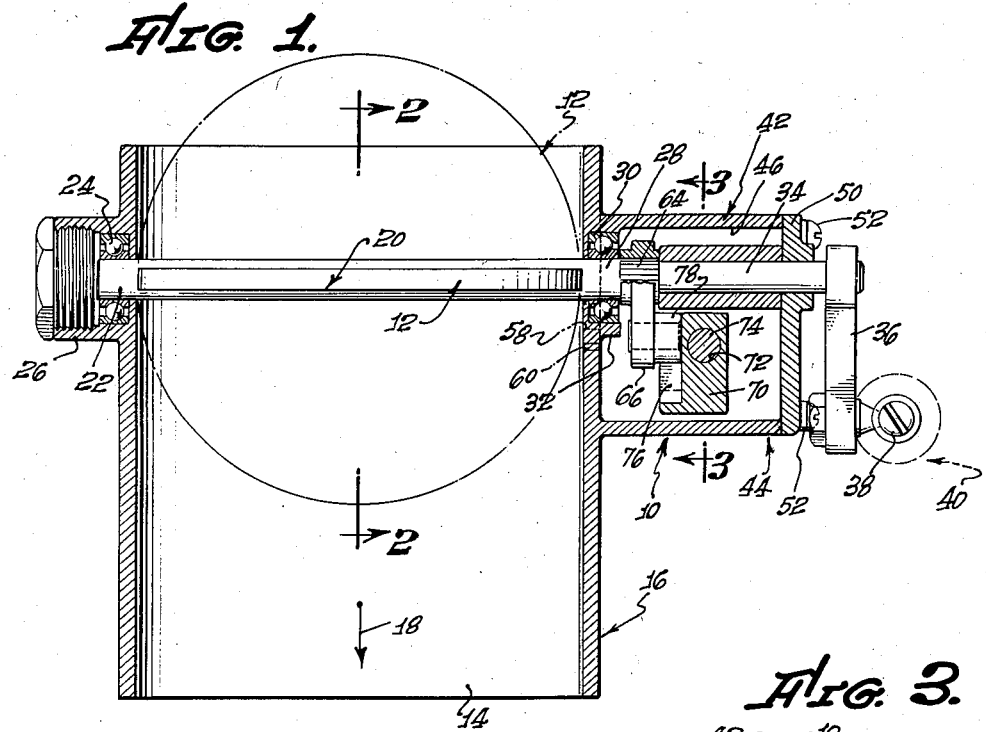
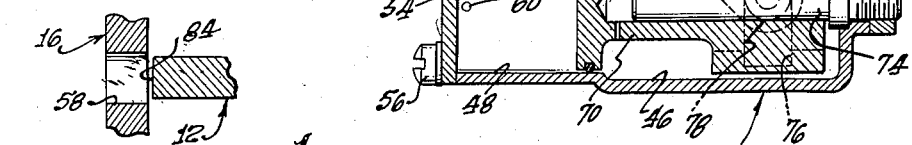
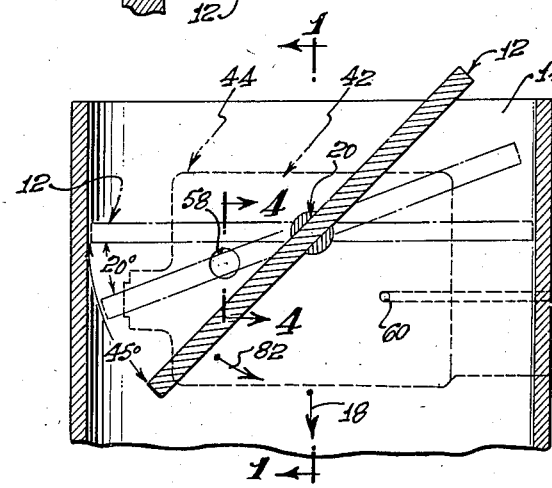
FREDRIC J. DIXON,
INVENTOR.
BY Thomas P. Mahoney
ATTORNEY.

United States Patent Office 2,845,246
Patented July 29, 1958

2,845,246

ACTUATING TORQUE EQUALIZING DEVICE

Fredric J. Dixon, Los Angeles, Calif., assignor to Telecomputing Corporation, a corporation of California Application September 12, 1955, Serial No. 533,814

4 Claims. (Cl. 251—24)

This invention relates to an actuating torque equalizing device and, more particularly, to a device adapted to be utilized in conjunction with a valve member to equalize the force which must be applied to such a valve member by its associated actuator to accomplish the movement thereof in the fluid stream in which it is located.

Difficulty has been encountered in the utilization of valves to control high flow volume and high pressure fluid in aircraft, and in other applications, and it has become necessary to apply increasingly greater force to the valves through the actuators therefor to accomplish the energization of said valves. Such problems are particularly accentuated in the case of butterfly valves whose aerodynamic characteristics cause considerable variation in the amount of force which must be applied to the valves during the opening or closing movement thereof.

For instance, in the conventional butterfly valve utilized for controlling fluid flows, the torque which must be applied by the actuator is relatively low when the valve is first opened. However, as the opening of the valve continues the torque increases and, when it reaches approximately 20° on its arc of movement, the torque required becomes excessive and reaches a maximum when the valve is located at an angle of approximately 45° with respect to its closed position. As the actuator continues to open the valve the torque requirement decreases, becoming minimal when the valve is fully opened and subjected to equal pressure on both sides thereof.

When the butterfly valve is being closed, or partially closed, to regulate the volume of fluid flowing therepast, the actuator torque operates on the butterfly valve in a negative sense, that is, the actuator tends to resist the movement of the butterfly valve toward closed position. When the butterfly valve reaches approximately an angle of 45° with respect to its closed position, the pressure differential thereacross assisting the closing movement of the butterfly valve reaches its highest point and considerable torque must be applied by the actuator to resist the rapid closing of the valve.

However, when the butterfly valve reaches a position wherein it is disposed at an angle of approximately 20° with respect to its closed position, the pressure differential once again becomes minimal and only minimal torque need be exerted by the actuator upon the butterfly valve to close the same. It can, therefore, be readily visualized that if the butterfly valve is operated by hand the variations in the force which must necessarily be applied during the closing or opening of the butterfly valve pose a considerable problem.

This problem is aggravated when electric motors or similar actuators are utilized to cause the energization of the butterfly valve since the motors tend to race during those increments of movement of the butterfly valve when the torque requirements are low and tend to move slowly when the torque requirements are high. Moreover, a large motor or actuator is necessary to meet maximum torque requirements.

It is, therefore, an object of my invention to provide an actuating torque equalizing device which includes a primary actuator for accomplishing the energization of the valve member and which also incorporates an auxiliary or secondary actuator adapted to reduce the force required of the primary actuator to move the valve member from open to closed or closed to open positions.

A further object of my invention is the provision, in an actuating torque equalizing device of the aforementioned character, of a secondary actuator which is in fluid communication with the fluid flow controlled by the valve member and whose energization is itself controlled by the various positions assumed by the valve member during its movement in the fluid stream.

Another object of my invention is the provision of an actuating torque equalizing device wherein the auxiliary actuator is maintained in fluid communication with the fluid in the passage in which the valve member is located by means of a plurality of ports and wherein the valve member itself controls not only the flow of fluid through the passage in which it is located but the flow of fluid through the ports into the auxiliary actuator.

Another object of my invention is the provision of an actuating torque equalizing device wherein the auxiliary actuator serves to equalize, throughout the stroke, the torque which must be applied to the valve member by the primary actuator for the valve member and thus reduces the peak torque which must be applied by hand or by the primary actuator.

Other objects and advantages of my invention will be apparent from the following specification and the accompanying drawing which is for the purpose of illustration only and in which:

Fig. 1 is a vertical, sectional view of a valve actuating device constructed in accordance with the teachings of my invention;

Fig. 2 is a sectional view taken on the broken line 2—2 of Fig. 1;

Fig. 3 is a sectional view taken on the broken line 3—3 of Fig. 1; and

Fig. 4 is an enlarged, fragmentary view showing the relationship between the valve member and one of the port means which establishes fluid communication between the auxiliary actuator and the valve member controlled fluid stream.

Referring to the drawing, and particularly to Figs. 1–3 thereof, I show an actuating torque equalizing device, indicated generally at 10, for a butterfly valve member 12 which is located in a fluid passage 14 defined by a primary, tubular housing 16. Fluid flows through the passage 14 in the direction of the arrow 18 when the valve member 12 is located in open position or partially open position.

The butterfly valve 12 is mounted on an elongated, rotatable shaft 20, said shaft having one extremity 22 supported in a bearing 24 located in a bearing box 26 formed integrally with the wall of the primary housing 16. An intermediate portion 28 of the elongated shaft 20 is supported in another ball bearing 30 which is seated in a receptacle 32 provided on the exterior wall of the primary housing 16. The other extremity 34 of the elongated shaft 20 has fastened thereupon a crank 36 which is connected to a push rod 38, or the like, which is, in turn, connected to a primary actuator 40, or which constitutes the same, by virtue of the fact that it is connected to a manual control. However, in most applications the push rod 38 will be connected to a source of power such as a fluid or electric motor which may be connected directly to the other extremity 34 of the elongated shaft 20.

Formed integrally with the exterior of the primary housing 16 is an auxiliary housing 42 which constitutes an enclosure for a secondary actuator or equalizing device 44. The secondary housing 42 includes a first chamber 46 and a second chamber 48, said first chamber being closed by a fluid-tight cover plate 50 which is secured in operative relationship with the side of the secondary housing 42 by means of bolts 52, or similar fasteners. Similarly, the second chamber is closed by a fluid-tight cover plate 54 secured in operative relationship with the auxiliary housing 42 by means of bolts 56, or similar fasteners.

A first port 58 is formed in the wall of the primary housing 16 and permits the first chamber 46 of the secondary housing 42 to be maintained in fluid communication with the fluid stream in the fluid passage 14. A second port 60 establishes fluid communication between the second chamber 48 of the secondary housing 42 and the fluid stream in the fluid passage 14. It will be noted that the first and second ports 58 and 60, respectively, are so located with respect to the axis of rotation of the butterfly valve 12 that when the butterfly valve 12 is located in its closed position, as best shown in phantom lines in Fig. 2 of the drawing, both ports are located on the downstream side of the valve 12.

The other extremity 34 of the butterfly valve shaft 20 extends through the first chamber 46 of the secondary housing 42 and a spline 64, as best shown in Fig. 1 of the drawing, is provided upon the shaft 20 for the reception of a lever 66 which connects said shaft to the secondary actuator 44, in a manner to be described in greater detail below.

The second chamber 48 of the secondary housing 42 is formed in the shape of a cylinder and receives, as best shown in Fig. 3 of the drawing, a piston 68, said piston being provided with a rearwardly extending, integral rod 70. The piston rod 70 is provided with a bore 72 for the reception of a guide 74 mounted in the wall of the secondary housing 42. An elongated, vertically oriented slot 76 is provided in a side of the piston rod 70 and receives a roller 78 mounted on the lower extremity of the lever 66.

Therefore, the piston 68 in the second chamber 48 of the secondary housing 42 serves to isolate said second chamber from fluid communication with the first chamber 46 of said housing and a pressure differential established thereacross, in a manner to be described in greater detail, will cause corresponding movement of the piston 68 in the second chamber 48 and thus cause the rotation of the lever 66 and its associated roller 78 in the slot 76 formed in the side of the piston rod 70. Rotation of the lever 66 will, of course, exert torque upon the butterfly shaft 20 to counteract forces exerted upon said shaft by the butterfly valve 12 due to dynamic forces imposed upon said butterfly valve by the fluid stream in the fluid passage 14 during the movement of said butterfly valve from closed to open or open to closed positions.

When the valve 12 is disposed in closed position, as best shown in Figs. 1 and 2 of the drawing, it is maintained at said position by the restraining effect of the primary actuator 40 on the elongated shaft 20. The movement of the butterfly valve 12 from its closed position, in which it prevents flow through the fluid passage 14, to an intermediate or fully opened position is initiated by energization of the actuator 40 which causes movement of the push rod 38 and concomitant rotation of the crank 36. The elongated shaft 20 is thus rotated in its bearings and the initiation of the movement of the butterfly valve 12 takes place. During the initial movement of the butterfly valve 12, the force or torque which must be applied to the elongated shaft 20 by the actuator 40 through the push rod 38 and the crank 36 is low and increases gradually until the butterfly valve 12 has reached a position wherein it is disposed at an angle of approximately 20° with respect to its closed position, as best shown in Fig. 2 of the drawing. A high pressure area exists immediately upstream of the partially opened butterfly valve 12 and a low pressure area exists immediately downstream thereof. The direction of flow is indicated by the arrow 18 in Figs. 1 and 2 of the drawing. As the butterfly valve is rotated in a counter-clockwise direction, indicated by the arrow 82 in Fig. 2 of the drawing, beyond the 20° point, the first port 58 is exposed by the passage of the edge 84 of the butterfly valve 12 thereover and fluid communication with the high pressure area is established through the first port 58 with the first chamber 46 of the primary actuator or equalizing device 10. It should be pointed out that all the butterfly valve angles set forth herein are approximate and it is not intended that the invention be limited thereby.

Since the second port 60, which is located in the low pressure area on the other side of the butterfly valve 12, maintains the second chamber 48 in fluid communication with said low pressure area, a pressure differential is thus established across the piston 68. This pressure differential causes movement of the piston 68 in a left-hand direction, as viewed in Fig. 3 of the drawing, and, of course, causes simultaneous movement of the piston rod 70 constituting an integral part of the piston 68.

As the piston 68 moves into the second chamber 48, the roller 78 is carried downwardly in the slot 76 in the piston rod 70 to cause rotation of the lever 66 and rotation of the elongated shaft 20 on which the butterfly valve 12 is mounted. Therefore, when it would become necessary for the actuator 40 to impress a greater force or torque upon the shaft 20, the actuating torque equalizing device constituted by the secondary actuator 44 provides the additional force or torque necessary and thus supplements the force applied by the primary actuator 40. This is accomplished by the fact that the butterfly valve 12, during its rotation, isolates the first port 58 from the second port 60 and thus exposes said first and second ports, respectively, to the pressure differential created by its restriction of the fluid passage 14.

When the butterfly valve 12 reaches the 45° point on its arc of rotation, as best shown in Fig. 2 of the drawing, the internal forces tending to resist continued motion of the butterfly valve 12 in the fluid passage 14 are greatest and the pressure differential thereacross is at its maximum. Thus, since the pressure differential is at its maximum, the pressure differential impressed upon the piston 68 within the secondary actuator 44 is maximum and the greatest boost or assistance is supplied to the shaft 20 to cause the rotation of the valve 12 in conjunction with the primary actuator 40. As the butterfly valve 12 moves further toward the full open position, the pressure differential across said valve is reduced and thus the pressure differential impressed on the first and second ports 58 and 60, respectively, is reduced, reducing the pressure differential across the piston 68.

When the butterfly valve 12 reaches the full open position, the pressure differential across the butterfly valve 12 and the first and second ports 58 and 60 is, of course, eliminated and the piston 68 is exposed to the same pressure through the ports 58 and 60 on both sides thereof. It should be noted that in both the fully closed and fully opened positions the first and second ports 58 and 60 are exposed to the same pressure within the fluid stream in the fluid passage 14 and that it is only during rotation of the butterfly valve 12, when the need arises for assistance by the auxiliary actuator 44, that a pressure differential exists across the butterfly valve 12 and across the first and second ports 58 and 60, respectively.

When the movement of the butterfly valve 12 toward closed position is initiated, the pressure differential between the ports 58 and 60 immediately increases and, since the valve has a natural tendency to close, both the force applied by the primary actuator 40 and the force applied by the secondary actuator 44 tend to resist the force of the fluid stream and its aerodynamic effect upon the valve 12 which would urge the valve 12 into closed position.

Once again, as the butterfly valve 12 reaches the 45° position on its arc of movement, the areodynamic forces exerted upon the butterfly valve 12 by the fluid stream within the fluid passage 14 are greatest and the pressure differential across the butterfly valve 12 and across the ports 58 and 60 is at its maximum. Thus, the resistance of the secondary actuator 44 to the closing movement is greatest. However, as the closing movement is continued beyond the 45° point, the negative torque requirement decreases until, at approximately 20° from the closed position, a neutral torque point is reached and at the same time the valve 12 passes over the first port 58 restricting the flow of fluid through said port and, during its continued movement, placing said first port in fluid communication with the same low pressure fluid as the second port 60. Thus, at the time when the need for minimal resistance is established, no pressure differential of any significance exists across the pistons 68 and it can move freely within the second chamber 48 of the auxiliary actuator 44 into its original position shown in Fig. 3 of the drawing.

I thus provide by my invention a valve actuating device which includes a valve member, a primary actuator, and a secondary actuator associated with the valve member to assist or resist movement of said valve and to reduce the torque which must be impressed by the primary actuator upon the valve member during movement from closed to open or open to closed positions. By providing an auxiliary or secondary actuator of the character indicated, the need for the application of greater or smaller forces by the primary actuator during actuation of the valve member is eliminated since the auxiliary or secondary actuator automatically equalizes or compensates for the peak forces to which the valve member is subjected.

I claim as my invention:

1. In a valve, the combination of: a wall defining a fluid passage and having a pair of spaced ports therein communicating with the fluid in said fluid passage; a butterfly valve member located for rotation in said fluid passage between said ports and during its arc of rotation controlling flow of fluid into one of said ports by overlying the same; a first actuator connected to said valve member for energizing the same; and a second fluid pressure responsive actuator connected to said valve member and energizable by fluid transmitted to opposite sides thereof through said ports to equalize the force which must be imposed by said first actuator on said valve member to cause the energization thereof.

2. In a flow control device, the combination of: a wall defining a fluid passage, said wall having a port therein; a butterfly valve member located in said passage; an actuator for said valve member; and a second fluid pressure responsive actuator for said valve member having one side in fluid communication with said port and the other side in communication with said passage downstream of said valve member, said valve member being mounted adjacent said port and having an arc of movement intersecting said port whereby the edge of said valve overlies said port and controls flow of fluid therethrough during rotation on said arc by said actuators.

3. In a flow control device, the combination of: a wall defining a fluid passage, said wall having first and second ports therein; a butterfly valve member located between said ports for controlling fluid flow in said passage, said valve member having an arc of movement intersecting one of said ports whereby the edge of said valve overlies said one port and controls flow of fluid therethrough during rotation on said arc; a primary actuator for rotating said valve member; and a secondary fluid pressure responsive actuator for rotating said valve member having its opposite sides respectively in fluid communication with said ports.

4. In a flow control device, the combination of: a primary housing defining a fluid passage; a rotary butterfly valve member in said passage; a primary actuator connected to said valve member; a secondary housing in fluid communication with said fluid passage through port means in a wall of said primary housing, said port means being located in the path of movement of said valve member, a secondary fluid pressure responsive actuator in said secondary housing energizable by fluid from said passage acting on one side thereof, said valve member controlling the fluid flow through said passage and overlying said port means during its movement by said actuators to control the flow of fluid to said secondary actuator the other side of said pressure secondary actuator having communication with said passage downstream of said valve member.

References Cited in the file of this patent

UNITED STATES PATENTS

| | | |
|---|---|---|
| 907,771 | Fulton | Dec. 29, 1908 |
| 1,256,466 | Gally | Feb. 12, 1918 |
| 2,095,263 | Moss | Oct. 12, 1937 |
| 2,172,855 | Siegert | Sept. 12, 1939 |
| 2,322,195 | Mock | June 15, 1943 |
| 2,349,145 | Darnell | May 16, 1944 |

FOREIGN PATENTS

| | | |
|---|---|---|
| 13,117 | Great Britain | June 11, 1850 |